(12) United States Patent
Jo

(10) Patent No.: US 9,727,992 B2
(45) Date of Patent: Aug. 8, 2017

(54) UNIFYING AUGMENTED REALITY AND BIG DATA

(71) Applicants: Geun Sik Jo, Incheon (KR); Inha Industry Partnership Institute, Incheon (KR)

(72) Inventor: Geun Sik Jo, Incheon (KR)

(73) Assignee: Geun Sik Jo, Icheon (KR)

( * ) Notice: Subject to any disclaimer, the term of this patent is extended or adjusted under 35 U.S.C. 154(b) by 0 days.

(21) Appl. No.: 14/273,670

(22) Filed: May 9, 2014

(65) Prior Publication Data
US 2014/0247283 A1    Sep. 4, 2014

(51) Int. Cl.
*G06T 11/00* (2006.01)
*G06T 11/60* (2006.01)

(52) U.S. Cl.
CPC ............. *G06T 11/60* (2013.01); *G06T 11/00* (2013.01); *G06T 11/001* (2013.01)

(58) Field of Classification Search
CPC ......... G06F 17/30247; G06F 17/30265; G06F 1/163; G09G 5/377; G06T 19/006
See application file for complete search history.

(56) References Cited

U.S. PATENT DOCUMENTS

| | | | | |
|---|---|---|---|---|
| 6,037,936 A * | 3/2000 | Ellenby | ........... | G01C 17/34 348/211.8 |
| 8,037,108 B1 * | 10/2011 | Chang | ........... | 707/803 |
| 2010/0023878 A1 * | 1/2010 | Douris et al. | ........... | 715/757 |
| 2012/0075343 A1 * | 3/2012 | Chen | ........... | G09G 5/397 345/633 |
| 2012/0116728 A1 * | 5/2012 | Shear | ........... | G06F 17/50 703/1 |
| 2013/0114100 A1 * | 5/2013 | Torii | ........... | G06F 11/0733 358/1.14 |

FOREIGN PATENT DOCUMENTS

WO    2014/035041 A1    5/2013

OTHER PUBLICATIONS

Jo, Geun-Sik, "A Unified Framework for Augmented Reality and Knowledge-based Systems in Maintaining Aircraft", 2014 Conference in the Twenty-Eighth American Association for Artificial Intellilgence, Jul. 27-31, 2014, Quebec City, Canada, 8 pages.

* cited by examiner

*Primary Examiner* — Jeffrey Chow
(74) *Attorney, Agent, or Firm* — Madeline F. Schiesser; Keohane & D'Alessandro PLLC

(57) ABSTRACT

Embodiments of the present invention relate to unifying augmented reality technology and big data. An interactive operation element may be defined. The interactive operation element is associated with an event and a location on an augmented reality (AR) screen. An action may be performed based on the event using a predefined communication protocol. The action may be associated with an information artifact which is derived from big data.

20 Claims, 17 Drawing Sheets

| Circle | | |
|---|---|---|
| Description | Represents position of hotspot | |
| Interaction | - | |
| Attributes | id. name, position, color, radius | |
| Label | | |
| Description | Hotspot name | |
| Interaction | - | |
| Attributes | id. name, position, text, txt color, bgcolor | |
| Button | | |
| Description | interactive annotation which accepts event | |
| Interaction | mouse click - link to external source or next task | |
| Attributes | id. name, position, text, txt color, bgcolor | |
| Menu | | |
| Description | interactive annotation which accepts event | |
| Interaction | mouse click - popup submenu or link to external source | |
| Attributes | id. name, position, text, txt color, bgcolor | |
| Animation | | |
| Description | Animated image, video, instruction | |
| Interaction | - | |
| Attributes | id. name, image, start and end position, rotation etc. | |

FIG. 5

```
<ReferenceView id="",filename=" ">
<hotspot id="", name="",position="",part_no="",amm_no="",ipc_no="">
  <annotations>
    <circle id="",name="",position="",color="",radius=""/>
    <menu id="",name="",position="",text="",bgcolor="",txtcolor="">
      <submenu id="",name="",position="",text="",bgcolor="",txtcolor="">
        <submenu id="",name="",position="",text="",bgcolor="",txtcolor="">
        </submenu>
      </submenu>
    </menu>
  </annotations>
</hotspot>
<hotspot id="", name="",position="", amm_no="", ipc_no="">
  <annotations>
    <circle id="",name="",position="",color="",radius=""/>
    <label id="",name="",position="",text="",bgcolor="",txtcolor="">
  </annotations>
</hotspot>
<hotspot id="", name="",position="", amm_no="", ipc_no="">
  <annotations>
    <circle id="",name="",position="",color="",radius=""/>
    <button id="",name="",position="",text="",bgcolor="",txtcolor="">
  </annotations>
</hotspot>
</ReferenceView>
```

FIG. 6

| Circle | Circle |
|---|---|
| MESSAGE_ID (MID) | 100 : Hello Message<br>110 : ACK Hello Message<br><br>120: View Change Message<br>130 : ACK View Change Message<br><br>140 : Mouse Click Event Message<br>150 : ACK Mouse Click Event Message<br><br>160 : Mouse Over Event Message<br>170 : ACK Mouse Over Event Message<br><br>180 : Instruction Information Message<br>190 : ACK Instruction Information Message<br><br>200 : AR Control Message<br>201 : ACK AR Control Message |
| SOURCE (S) | 1 : KBS<br>2 : AR |
| DESTINATION (D) | 1 : KBS<br>2 : AR |
| SLIDE ID | String (e.g. 1, 2, 3 ...) |
| BUTTON NAME | String (e.g. rv2_hsp1_bt1) |
| MOUSE_OVER_TYPE | 1 : in<br>2 : out |
| INSTRUCTION_NUMBER | String (e.g. INS-01, INS-03 ... ISN-10 ...) |
| EVENT TYPE | 1 : Previous<br>2 : Next |
| ACTION TYPE | 1 : SHOW<br>2 : HIDDEN<br>3 : CLOSE |

FIG. 7

UNIFYING AUGMENTED REALITY AND BIG DATA

CROSS-REFERENCE TO RELATED APPLICATION

This application is the National Stage Entry of International Application No. PCT/KR2013/006014 filed on Jul. 5, 2013 which claims priority from and the benefit of Korean Patent Application No. 10-2013-0006014 filed on Aug. 28, 2012, both of which are herein incorporated by reference for all purposes as if fully set forth herein.

TECHNICAL FIELD

Embodiments of the present invention relate generally to unifying augmented reality technology and big data. Specifically, the present invention relates to the interaction between a user and virtual objects within an augmented reality environment.

BACKGROUND

Augmented reality (AR) is a live copy view of a physical, real-world environment whose elements are augmented (or supplemented) by computer-generated sensory input such as sound, video, graphics, or GPS data. It is related to a more general concept called mediated reality, in which a view of reality is modified by a computer. As a result, the technology functions by enhancing one's current perception of reality. By contrast, virtual reality replaces the real world with a simulated one. Augmentation is conventionally in real-time and in semantic context with environmental elements, such as sports scores on television (TV) during a sporting event. With the help of advanced AR technology (e.g., adding computer vision and object recognition), the information about the surrounding real world of the user becomes interactive and can be digitally manipulated. Artificial information about the environment and its objects can be overlaid on the real world.

Big data is the term for a collection of data sets so large and complex that it becomes difficult to process using on-hand database management tools or traditional data processing applications. The challenges include capture, curation, storage, search, sharing, transfer, analysis, and visualization. The trend to larger data sets is due to the additional information derivable from analysis of a single large set of related data, as compared to separate smaller sets with the same total amount of data, allowing correlations to be found to spot business trends, determine quality of research, prevent diseases, link legal citations, combat crime, and determine real-time roadway traffic conditions, and the like.

SUMMARY

Embodiments of the present invention relate to unifying augmented reality technology and big data. An interactive operation element may be defined. The interactive operation element is associated with an event and a location on an augmented reality (AR) screen. An action may be performed based on the event using a predefined communication protocol. The action may be associated with an information artifact which is derived from big data.

A first aspect of the present invention provides an interactive method for unifying augmented reality (AR) and streaming video with big data, the method comprising the computer-implemented steps of: defining an interactive operation element, wherein the interactive operation element is associated with an event; associating the interactive operation element with a location on an augment reality screen; and performing an action based on the event using a communication protocol, wherein the action is associated with an information artifact derived from big data, wherein the big data is collected through the Semantic Web.

A second aspect of the present invention provides a computer program product for unifying AR and streaming video with big data, the computer program product comprising a computer readable storage media, and program instructions stored on the computer readable storage media, to: define an interactive operation element, wherein the interactive operation element is associated with an event; associate the interactive operation element with a location on an augment reality screen; and perform an action based on the event using a communication protocol, wherein the action is associated with an information artifact derived from big data, wherein the big data is collected through the Semantic Web.

BRIEF DESCRIPTION OF THE DRAWINGS

These and other features of this invention will be more readily understood from the following detailed description of the various aspects of the invention taken in conjunction with the accompanying drawings in which:

FIG. 5 depicts a table showing example interactive operation element properties and property attributes according to an embodiment of the present invention;

FIG. 6 depicts XML code illustrating an explicit connection between an information artifact and interactive operation element according to an embodiment of the present invention;

FIG. 7 depicts an exemplary structure definition of a communication protocol according to an embodiment of the present invention;

Figure 1:
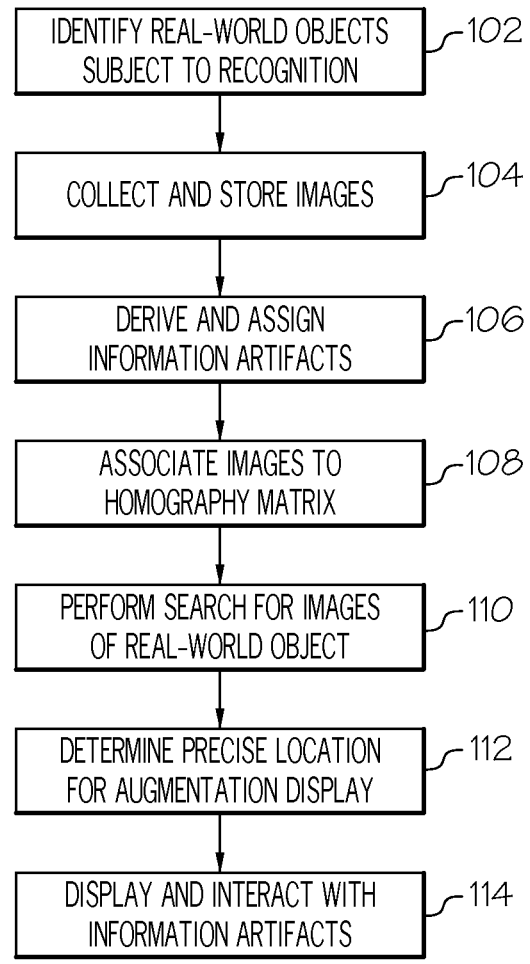
FIG. 1 depicts an interaction method for unifying conventional augmented reality (AR) technology and information artifacts.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention relate to unifying augmented reality technology and big data. An interactive operation element may be defined. The interactive operation element is associated with an event and a location on an augmented reality (AR) screen. An action may be performed based on the event using a predefined communication protocol. The action may be associated with an information artifact which is derived from big data.

Augmented reality (AR) is divided into marker based technology and non-marker based technology. In marker based augmented reality, an image including a particular image of a marker such as a black and white pattern or a barcode is recognized and a relative coordinate of an area in which the virtual object is to be displayed is determined, and the virtual object is displayed based thereon; whereas, in non-maker based augmented reality, an object within the image is directly identified and related information is obtained. Since marker based approach can be included in the scope of non-marker based approach research, application of the present invention can be illustrated using "point of interest" based technology which is one of the sub-methods of non-marker based approach.

Augmented reality (AR) in the last decade has increased in popularity in various areas, such as education, advertising, maintenance, marketing, and entertainment. In the areas of maintenance and education specifically, the use of augmented reality can provide for the transfer of knowledge at a faster rate than other traditional methods. Additionally, the use of AR can help companies train their employees faster and better. The use of AR can also assist company employees in performing job tasks more competently and efficiently.

An area that can benefit from the use of AR is the maintenance of complex systems, such as aircraft maintenance. To that end, three-dimensional (3D) or two-dimensional (2D) graphics or images, text, or other media may be generated such that they are overlaid on and registered with surrounding objects in the environment. Applying AR to maintenance tasks could make it possible for users to be trained for those tasks, and actively assisted during their performance, without ever needing to refer to separate paper or electronic technical orders. Incorporating instruction and assistance directly within the task domain, and directly referencing the equipment at which the user is looking, may eliminate the need for maintenance employees to continually switch their focus of attention between the task and its separate documentation. Use of AR may decrease the overall time of the repair, reduce errors in the repair process, and increase the knowledge of maintenance personnel.

FIG. 1 depicts a high-level flow diagram of a process for the conventional realization and operation of unifying augmented reality or streaming video with big data to enable interaction between a user and virtual objects within an augmented reality or video environment. In step 102, real-world objects related to a specific scenario or sequential procedure (e.g., tools and parts used in aircraft maintenance) which are to be subject to recognition in an augmented reality environment are identified. In other words, meaning situations where performance must follow a sequential procedure (e.g., aircraft or submarine maintenance) are determined. In one example, the big data is collected through the Semantic Web. The Semantic Web is the extension of the World Wide Web that enables people to share content beyond the boundaries of applications and websites. Examples provided herein describe the process for unifying AR and big data. However, in other examples, big data may also be unified with streaming video. As used herein, streaming video includes any type of video that can be displayed on a video player or website using a web browser that supports streaming media.

In step 104, images of the real-world objects are collected. In one example, images from various camera angles showing the front (representative image), left, right, top, and bottom of the real-world object are collected. The images are catalogued and stored in a database for easy retrieval.

In step 106, information artifacts are derived and assigned to each real-world object subject to recognition. These artifacts may include a label, circle, button, thumbnail, video, image, text, or the like. The information artifacts are virtual objects that can be overlaid on the actual equipment being maintained which can significantly improve the productivity of individuals performing maintenance tasks. As used herein, information artifacts are derived from big data.

In order for AR applications to merge virtual objects with real objects, the two sets of objects must be properly located and aligned in step 108. To that end, each representative image is associated with a homography matrix. In the field of computer vision, any two images of the same planar surface in space are related by a homography. Once camera rotation and translation have been extracted from an estimated homography matrix, this information can be used to insert a representative image of the real-world object into the scene, so that the representative image is rendered with the correct perspective and appear to have been part of the original scene.

In step 110, a search is performed for images of a real-world object when a camera is facing a real-world object that has been defined as subject to recognition. Real-time images generated by the camera are compared with images saved in the database to find a representative image from a similar angle.

In step 112, a homography matrix is calculated between the representative image and the real-world display. The homography matrix is used to alter the direction and location of the representative image in order to properly align the representative image and/or information artifacts in the augmented display.

In step 114, a user may interact with the overlaid information artifacts. Detailed information associated with information artifacts may be displayed based on the user's selected method of action (e.g., a single or double mouse click, mouse over, voice control, gesture, or the like).

Advancement of augmented reality technology has brought attempts of practical application of augmented reality technology to industries. However, in the case of large amount of artifact data, conventional technology for an interactive method and system for unifying augmented reality technology and big data has not been ideal. Until now, augmented reality took on relatively small amounts of data, making it easy to maintain artifact information. However, with an increasing amount of artifact data being needed, there is a need for an interactive system and method for unifying information artifacts with augmented reality.

Conventional AR technology is based on computer vision technology in which focus is placed on real-world object recognition, tracking, and information artifact composition technologies. However, as stated above, if a vast amount of information artifact data is needed for augmenting reality, artificial intelligence such as a knowledge based system (KBS) is needed. A KBS is a computer program that reasons and uses a knowledge base to solve complex problems. The term is broad and is used to refer to many different kinds of systems. The one common theme that unites all knowledge based systems is an attempt to represent knowledge explicitly via tools such as ontologies and rules rather than implicitly via code the way a conventional computer program does. A knowledge based system has at least one and usually two types of sub-systems: a knowledge base and an inference engine.

A KBS is independent from computer vision technology and needs to be maintained using a heterogeneous software (S/VV) platform. Particularly since KBS's vast data continues to be generated, revised, supplemented, and maintained through the medium of the Internet, the direction of the technology is progressing towards more structure where electronic documents are maintained by ontology technology based on Semantic Web.

Since augmented reality technology's S/VV platform is fundamentally different than KBS-based S/W, as well as programming language for both, the present invention defines an interaction method and protocol for two different platform systems, so that the offered solution displays information artifacts (defined in step 106) matching an AR's context (displayed in step 114). This is provided by KBS through an interaction method as well as a unifying protocol, described in detail below.

An interactive method is provided for unifying AR and big data. The method includes three steps. First, each element to offer interaction between a user and an information artifact to be displayed on an AR screen is defined. Second, the location where the information artifact is to be displayed on an AR screen is defined. Third, a communication protocol for the interaction of an AR engine and big data is defined.

Display of information artifacts (i.e., overlaid virtual objects) may be based on one or more predefined user actions. User actions may include, but are not limited to, single or double mouse click, mouse over, scroll, gesture, voice command, or other predefined user action. Additionally, display of information artifacts may be based on the type of information artifact, AR situation or context, and/or a user action.

Figure 2:
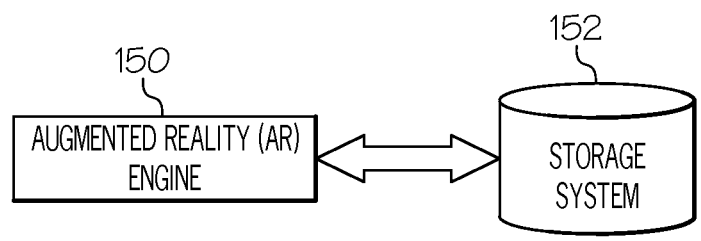
FIG. 2 depicts a conventional system for unifying conventional augmented reality (AR) technology and information artifacts.

FIG. 2 depicts a conventional system for unifying conventional AR technology and information artifacts as previously explained. For the realization and operation of AR, the focus of AR engine 150 is real-world object recognition, tracking, and information artifact composition technologies. Information artifacts may be stored in storage system 152. Storage system 152 can include VCRs, DVRs, RAID arrays, USB hard drives, optical disk recorders, flash storage devices, or any other similar storage device. As used herein, information artifacts may be stored in any suitable format including XML documents, flat files, CSV files, SQL tables, relational database tables, and others.

However, as the data size increases, it becomes difficult for the conventional system shown in FIG. 1 to handle the data load. As size of the data enlarges, so increases the technical difficulty and amount of time to process the data. From a technical standpoint, heterogeneous types of data may exist in these data repositories. The data cannot be obtained directly and must be obtained through deduction. The data may also be frequently updated. Also, from temporal standpoint, for effective reduction of research and development time, development of both an AR module and big data processing module must take place simultaneously.

For example, to develop an AR system for aircraft maintenance, initiation of simultaneous development of an AR engine module and large data processing module regarding aircraft manual is ideal for effective temporal reduction. As such, since conventional AR technology has been taking on relatively small amounts of data, it has been relatively easy to handle information artifacts. However, with increasing amount of data being used in AR, there is a need for a more effective system and method for unifying AR and information artifacts.

The present invention described herein focuses on two of the seven steps described in FIG. 1: steps 106 and 114. To that end, a connection must be made between steps 106 and 114. Step 106 relates to big data stored in KBS and step 114 relates to a user interaction interface used in the AR system.

Figure 3:
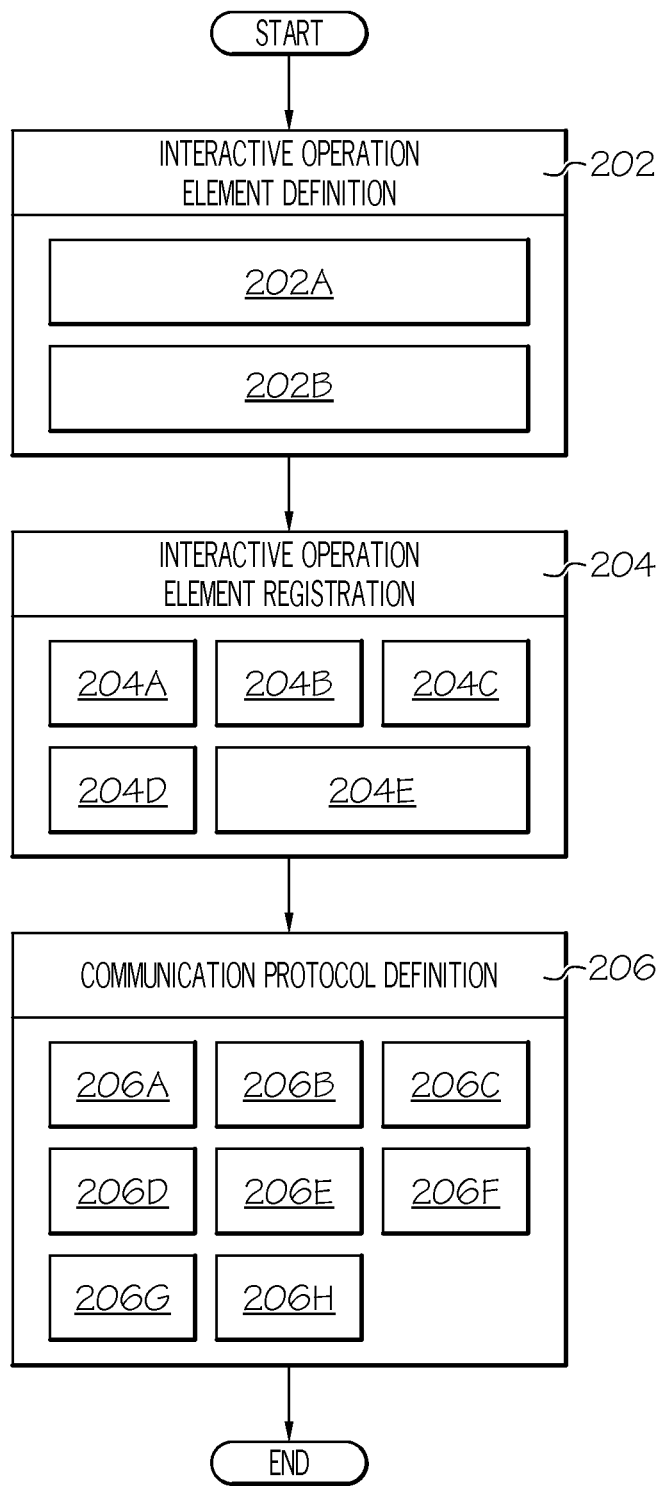
FIG. 3 depicts a system for unifying conventional augmented reality (AR) technology and information artifacts according to an embodiment of the present invention.

FIG. 3 depicts an interaction method for unifying AR and big data. As shown in FIG. 3, the interaction method may include interactive operation element definition 202, interactive operation element registration 204, and communication protocol 206. Interactive operation element definition 202 defines the user actions that may be performed for a particular information artifact. Interactive operation element definition 202 may include, among others, mouse over event definition 202A and mouse click event definition 202B.

Each information artifact may include any number of interactive operation elements that offer interaction between a user and an information artifact (i.e., virtual object) displayed on the AR screen. Interactive operation elements may be associated with user actions defined in interactive operation element definition 202. When a user performs a particular action, a predefined event may be triggered.

Essentially, each interactive operation element is associated with a hotspot (or area on the screen) which, when acted upon, triggers a predefined event. The event may include providing additional information on the real-world object associated with the area selected by displaying an information artifact or linking the user to further related content (e.g., the next step in a maintenance sequence). Exemplary user actions include, but are not limited to, single or double mouse click, physical gestures, and voice commands.

Figure 4:
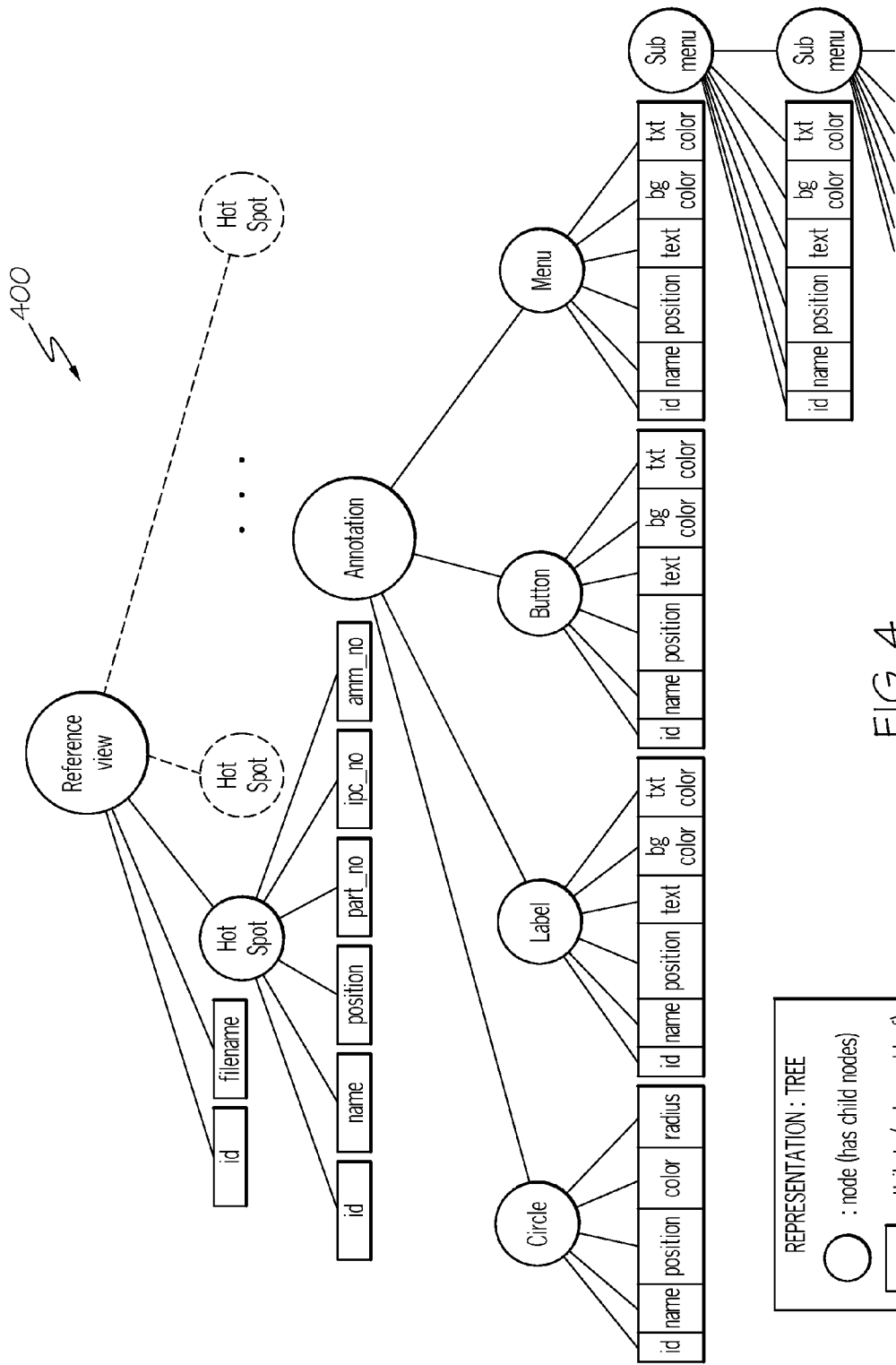
FIG. 4 depicts a tree structure representation for interactive operation elements according to an embodiment of the present invention.

Interactive operation element registration 204 defines the relationship between each interactive operation element and interactive artifact. In other words, interactive operation elements and associated user actions are defined, along with the events to be performed when the user actions are executed. Interactive operation element registration 204 may include, among others, circle registration 204A, label registration 204B, button registration 204C, menu registration 204D, and animation registration 204E. FIG. 4 depicts the relationship between an interactive operation element and an information artifact.

Communication protocol definition 206 defines the communication protocol between AR and big data. Communication protocol definition 206 may include, among others, message ID definition 206A, source ID definition 206B, destination ID definition 206C, button name definition 206D, mouse over type definition 206E, instruction number definition 206F, event type definition 206G, and action type definition 206H. Communication protocol definition 206 defines the communication protocol used to facilitate the event to be performed based on the user action.

For illustrative purposes, two user actions associated with interactive operation element are discussed below. First, a "mouse over" event can take place. A mouse over event may be defined as a default value for the composition and display of an information artifact. In other words, if a user performs a mouse over event over an interactive operation element in the real world screen (invisible to the user), an associated information artifact may be displayed.

Performing an event may expose a large amount of data which may result in the user's loss of interest or discomfort. At the same time, augmenting multiple artifacts on a single screen may incur repetition issues. Mouse over is therefore a solution to these issues. When an augmented artifact is invisible and a user moves the mouse over an area of interest, such request is recognized and an associated information artifact becomes visible to the user.

Second, a user may perform a mouse click event on a visible information artifact. The user may perform this event when the user wants to display additional information or move to a subsequent screen. The information artifact may be displayed either in a circle or with a description label. The mouse click event may pop up a menu or link to an external site, altering the user's point of interest as well as transitioning to a subsequent screen.

Referring back to FIG. 3, a connection is made between the interactive operation element registration S204 where actual registration of information artifacts on an AR screen takes place and the interactive operation element definition S202 where the interactive operation elements are defined. The connection enables user interaction. FIG. 4 depicts a tree structure representation for interactive operation elements used in AR. As a structure to describe an interactive operation element, an AR screen can include property values such as a screen identifier (ID), file name, and one or more hotspots. Each hotspot may include properties such as a hotspot identifier (ID), name, position, or part number. Each hotspot may also include one or more interactive operation elements (or annotation elements). Each interactive operation element may take on properties such as a circle, label, button, and/or menu and may be described using property attributes such as an element identifier (ID), name, position, color, or the like. FIG. 5 depicts a table 500 showing example interactive operation element properties and property attributes.

Connection between an information artifact and interactive operation element may occur in one of the two ways: explicitly or implicitly. An explicit connection is made when direct display of an information artifact (or annotation) file (e.g. XML or RDF) [please fix this sentence and is there an explanation of "implicit connection"?. The Resource Description Framework (RDF) has come to be used as a general method for conceptual description or modeling of information that is implemented in web resources, using a variety of syntax notations and data serialization formats. An implicit connection can be made with a coding label.

FIG. 6 depicts XML code illustrating an explicit connection between an information artifact and interactive operation element. Referring back to FIG. 3, communication protocol definition 206 may be broken down to two parts: a field name and a field value. FIG. 7 depicts an exemplary structure definition 700 of a communication protocol. Structure definition may be used for: (1) delivery of event derived from AR to KBS; or (2) processing of a transmitted event and, therefore, the delivery of a respective response to AR. In other words, structure definition 700 provides the communication protocol for the interaction between AR and big data.

In one example, fields names may include, but not be limited to, MESSAGE_ID, SOURCE, DESTINATION, SLIDE_ID, BUTTON_NAME, MOUSE_OVER_TYPE, INSTRUCTION_NUMBER, EVENT_TYPE, and ACTION_TYPE. Field names and field values may include alpha numeric characters and special characters.

Figure 8A:
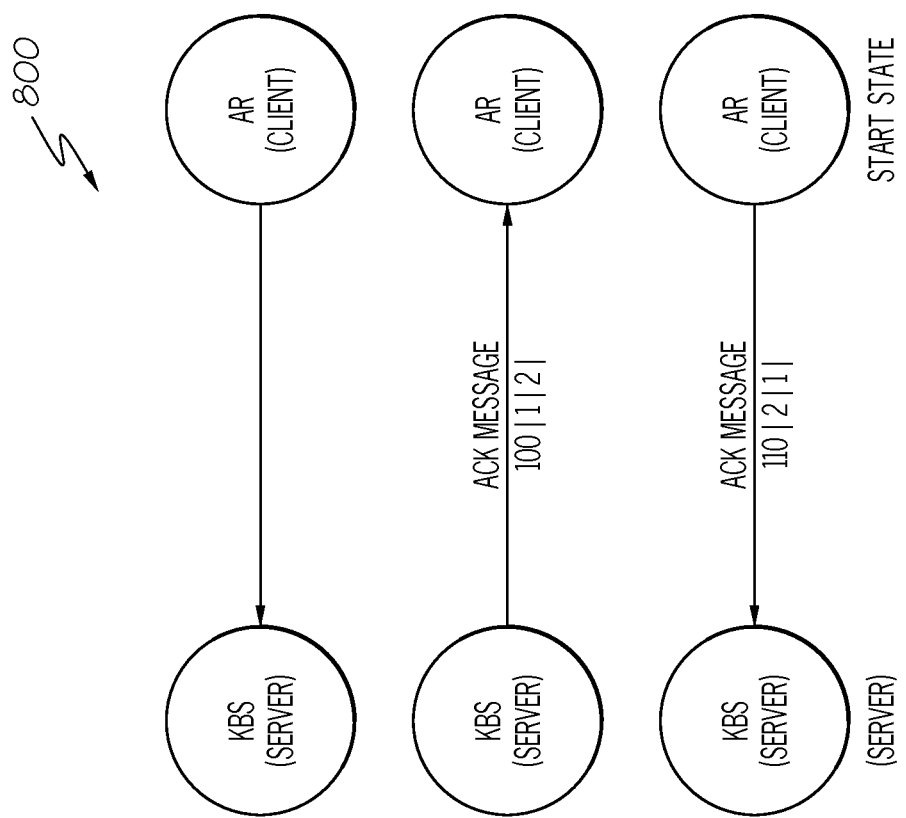
FIG. 8A depicts an initial communication method according to an embodiment of the present invention.
Figure 8B:
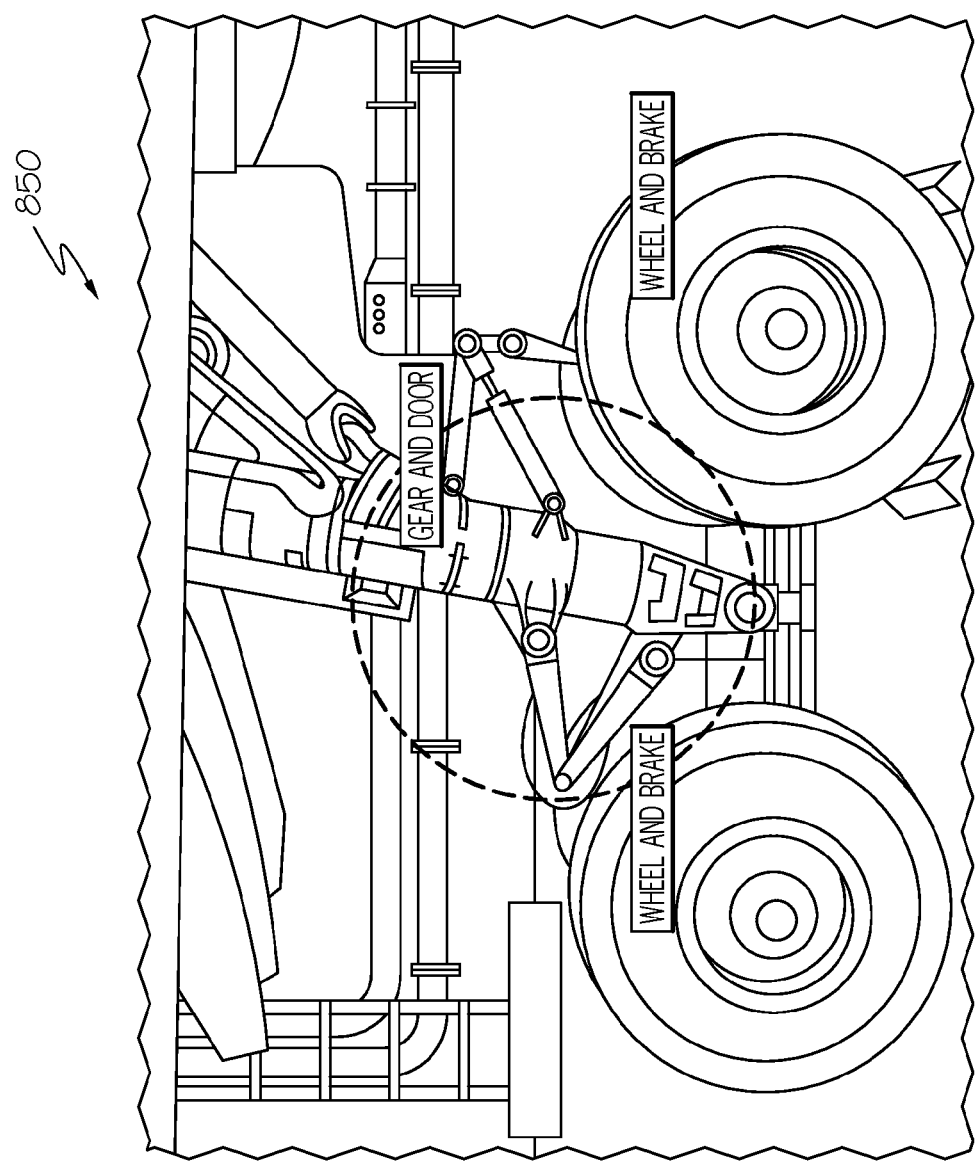
FIG. 8B depicts a screen display of information artifacts according to an embodiment of the present invention.

The invention will be described in more detail with reference to examples described in FIGS. 8A-12B. FIGS. 8A-12B depict the interaction between AR and big data using the communication protocol shown in FIG. 7. FIG. 8A depicts an initial communication method between AR and KBS. FIG. 8B depicts a screen display of information artifacts (i.e., overlaid virtual objects) based on the initial communication method in FIG. 8A. The protocol of FIG. 8A utilizes the structure shown in FIG. 7. As an initial signal, 'HELLO' message and 'ACK HELLO' message are transmitted. The 'HELLO' message is from KBS to AR. The 'ACK HELLO' message is from AR to KBS. The acknowledgement (or ACK) signal acts as a transmission control character used to show a positive response from a receiver to a transmitter. The response proves a signal exists for data transmission without error.

Figure 9A:
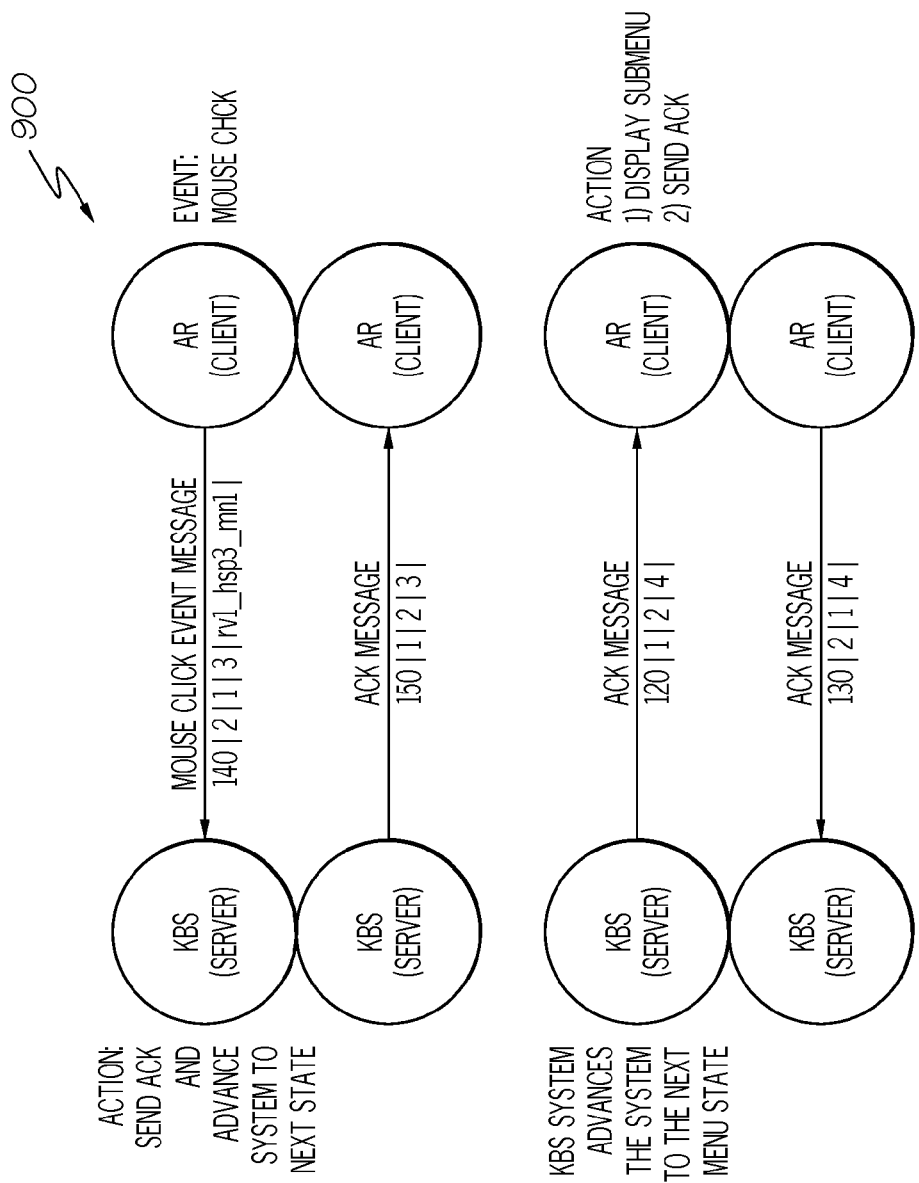
FIG. 9A depicts a communication method according to an embodiment of the present invention.
Figure 9B:
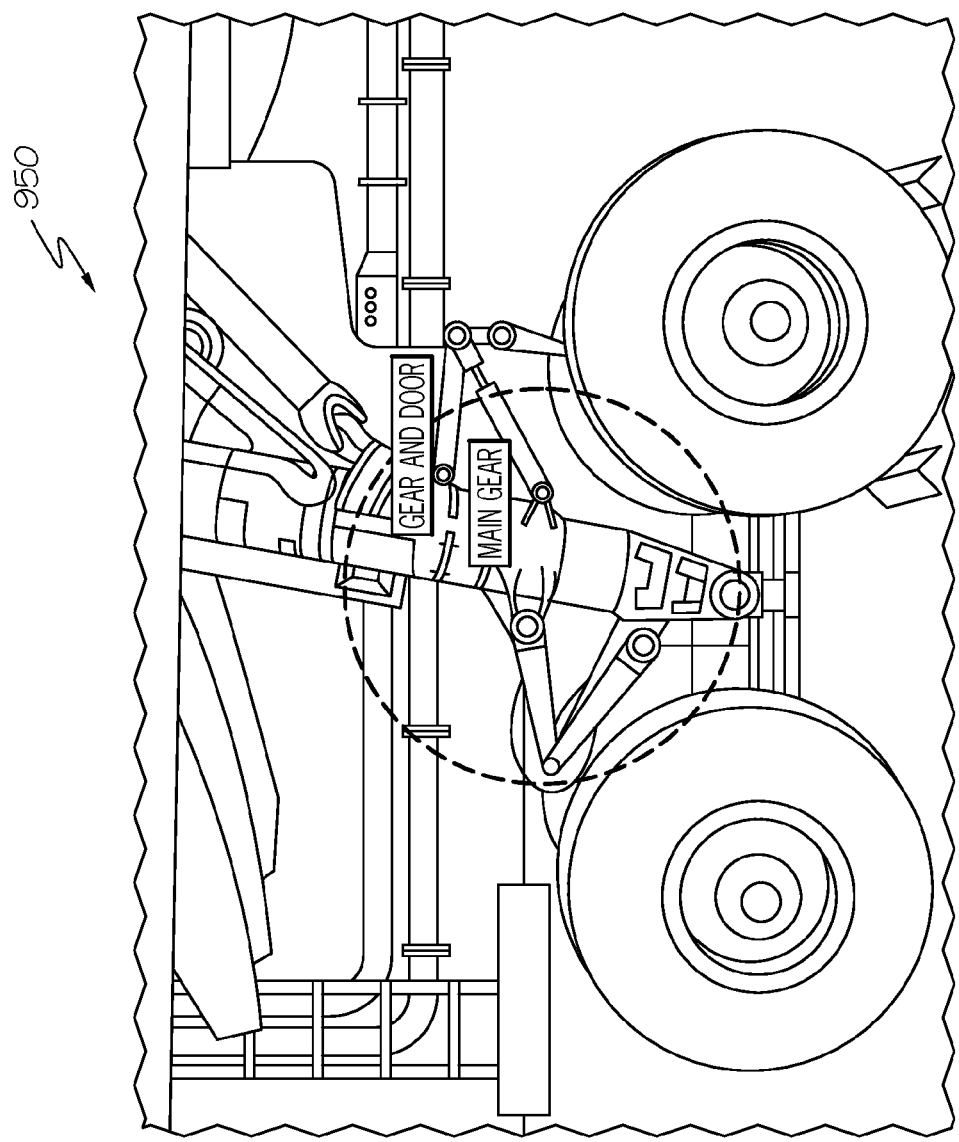
FIG. 9B depicts a screen switch to a submenu display according to an embodiment of the present invention.

If the interactive operation element ('Gear and Door' button as shown in FIG. 8B) is clicked on, the communication method illustrated in FIG. 9A occurs. The mouse click event has been defined to trigger an action to display a submenu. To that end, the 'Mouse Click Event Message' protocol regarding the mouse click event is transmitted from AR to KBS. In return, an acknowledgement response protocol is delivered from KBS to AR. In order to switch screen according to the mouse click, screen switch protocol 'View Change Message' is transmitted from KBS to AR. AR performs a screen switch to display a submenu (as shown in FIG. 9B) and then sends an 'ACK' message to KBS.

A mouse over event can be used to display a partial amount of data from a large amount of data based on a user request. A mouse over event can be defined to display an information artifact (or annotation). As such, a user can mouse over to an interested part's location to display the information. When moving a mouse to a selected part from FIG. 9B's AR screen, the communication method as that shown in FIG. 10A may occur.

Figure 10A:
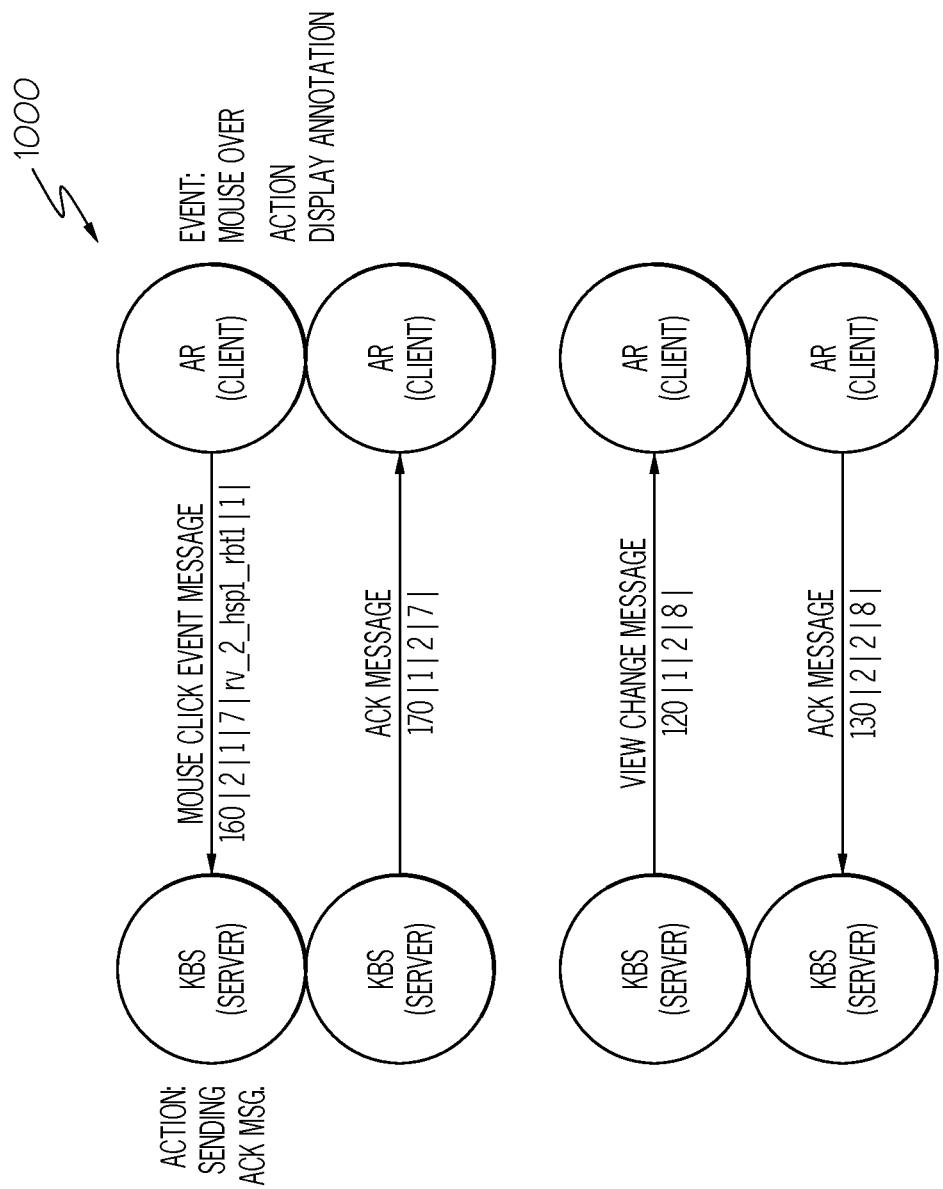
FIG. 10A depicts a communication method according to an embodiment of the present invention.
Figure 10B:
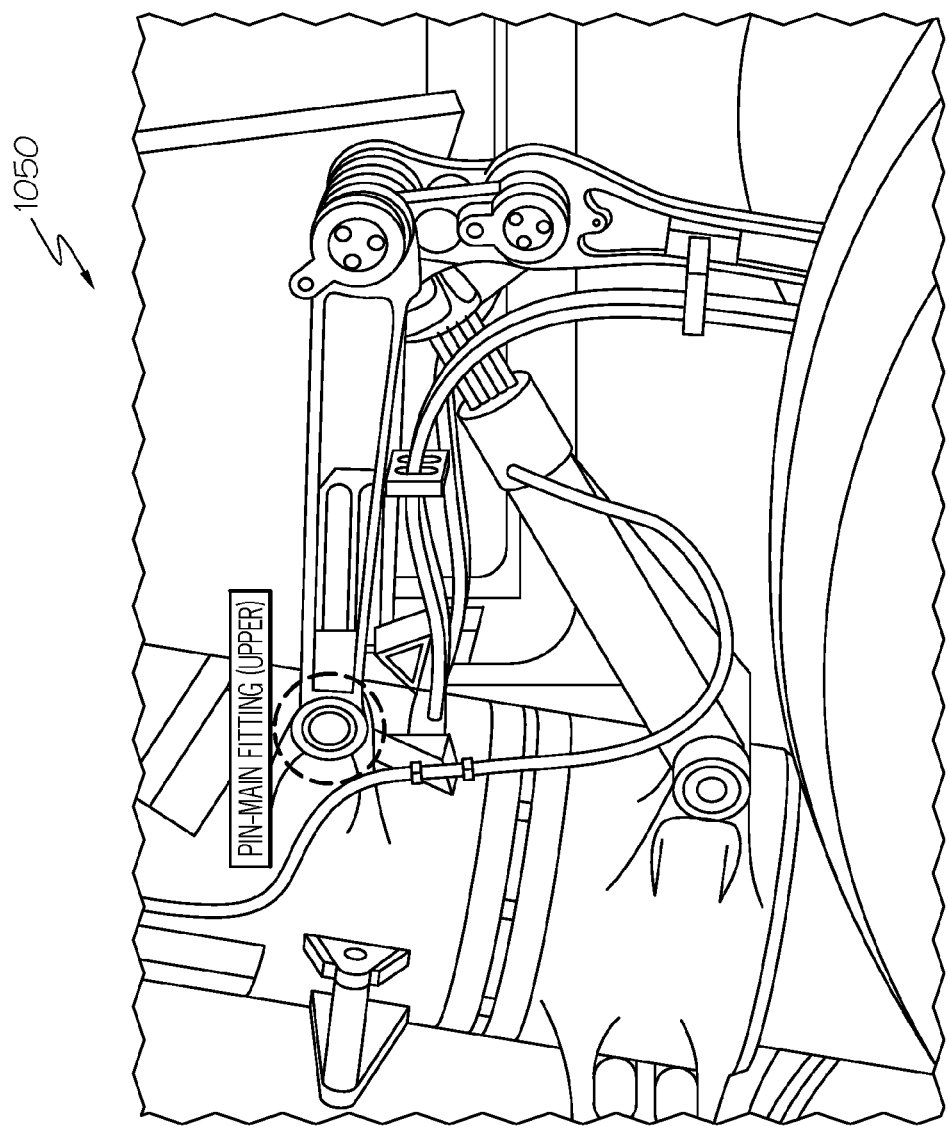
FIG. 10B depicts a display of an information artifact from a screen according to an embodiment of the present invention.
Figure 11A:
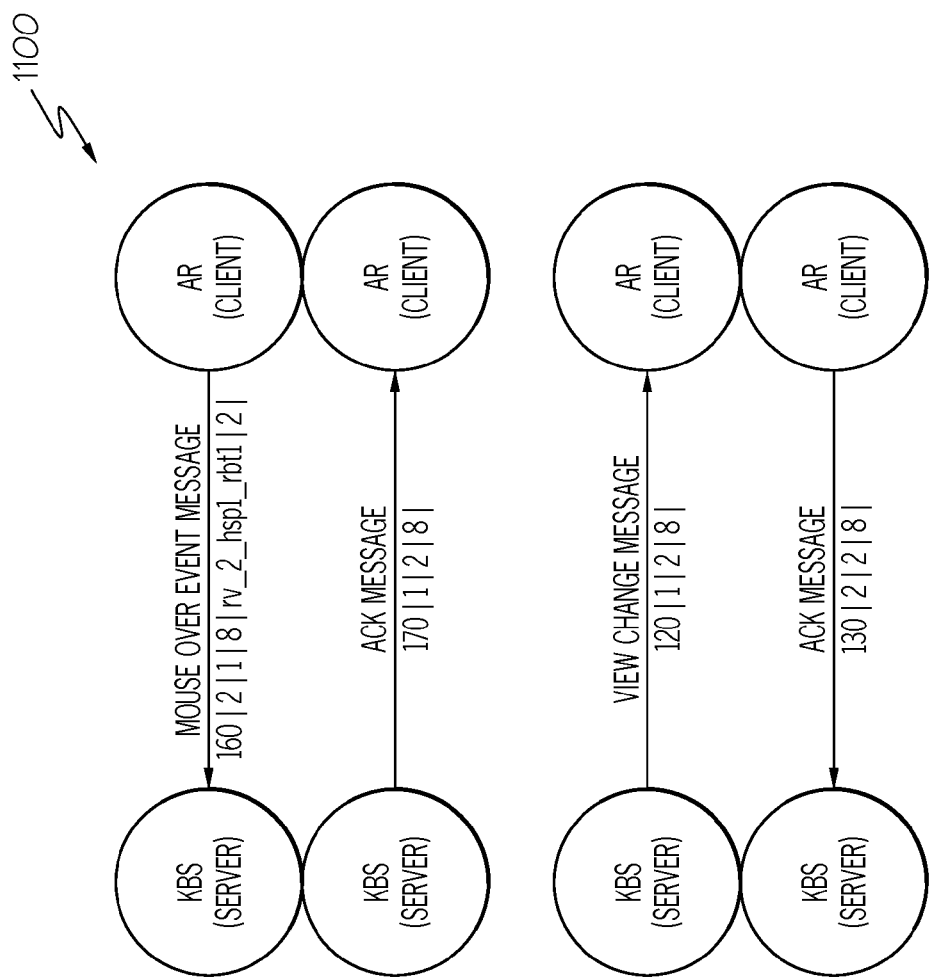
FIG. 11A depicts an event message according to an embodiment of the present invention.

When a mouse is moved over a particular location, a 'Mouse Over Event Message (In)' message can be transmitted from AR to KBS. When the message is received, the KBS transmits a response message to AR. Based on the real-time context, KBS sends a 'View Change Message' message as a response. To AR, receipt of the 'View Change Message' means to display the information artifact 'pin-Main Fitting (Upper)' on the AR screen. The information artifact is shown in FIG. 10B. AR then transmits a message response to KBS. When the mouse is moved to another location in the AR screen, 'Mouse Over Event Message (Out)' message is transmitted to KBS, as shown in FIG. 11A.

Figure 11B:
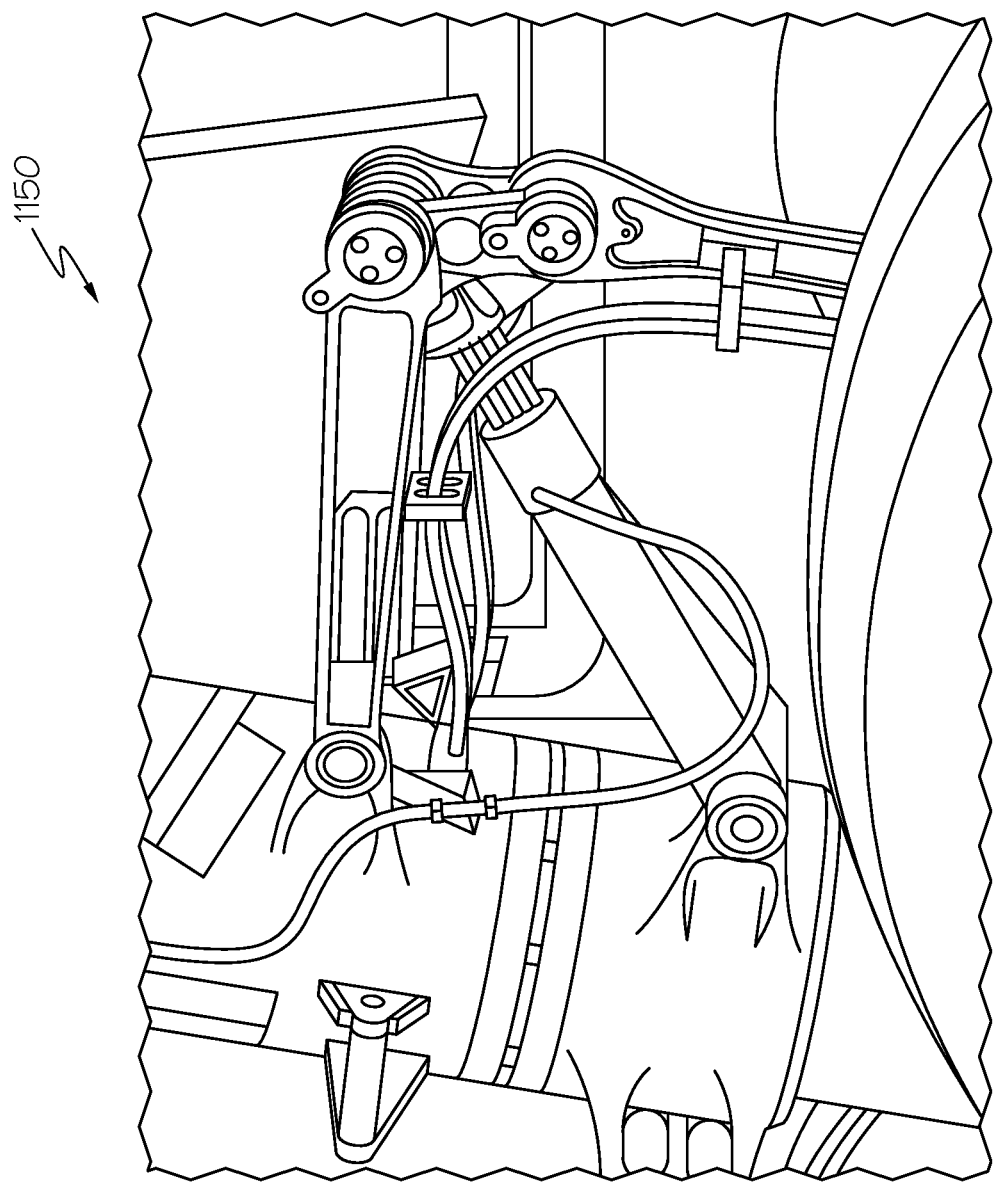
FIG. 11B depicts a removal of an information artifact from a screen according to an embodiment of the present invention.

When KBS receives the 'Mouse Over Event Message (Out)' message, KBS transmits a response message to AR. KBS then transmits a 'View Change Message' to AR. This message says 'move context to No. 8' to AR. When in receipt of this message, AR removes the information artifact from the AR screen, as shown in FIG. 11B.

Figure 12A:
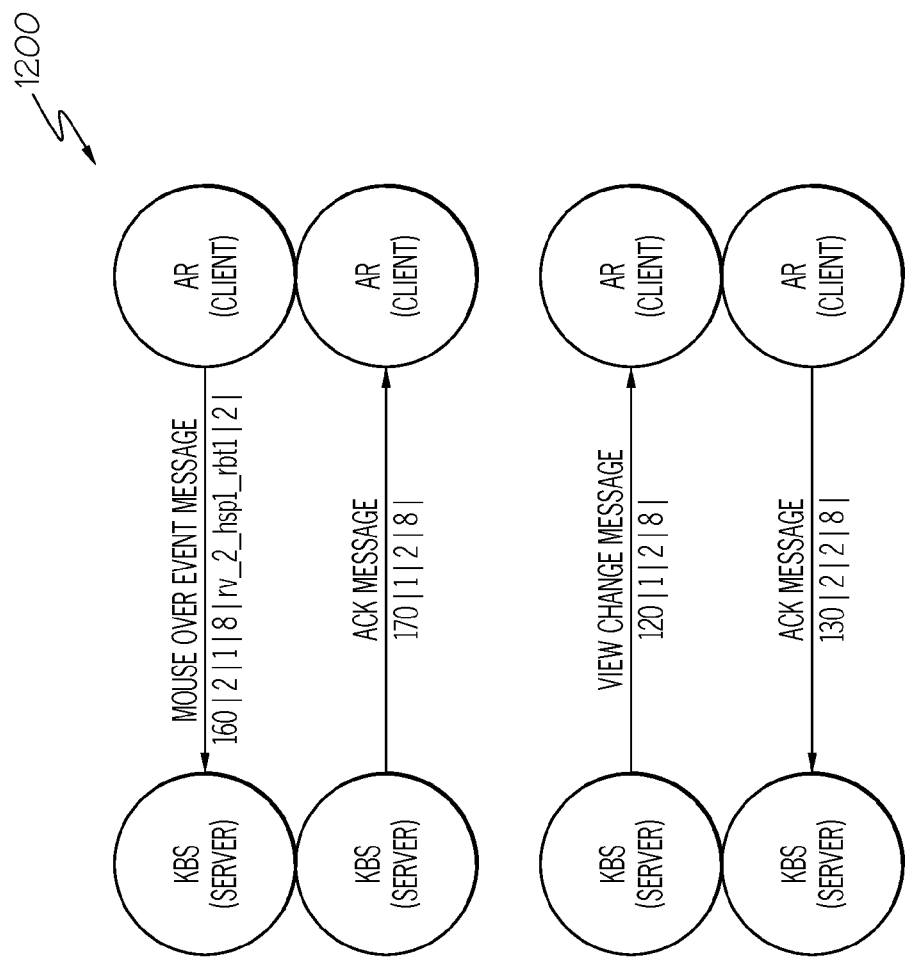
FIG. 12A depicts an event message according to an embodiment of the present invention.
Figure 12B:
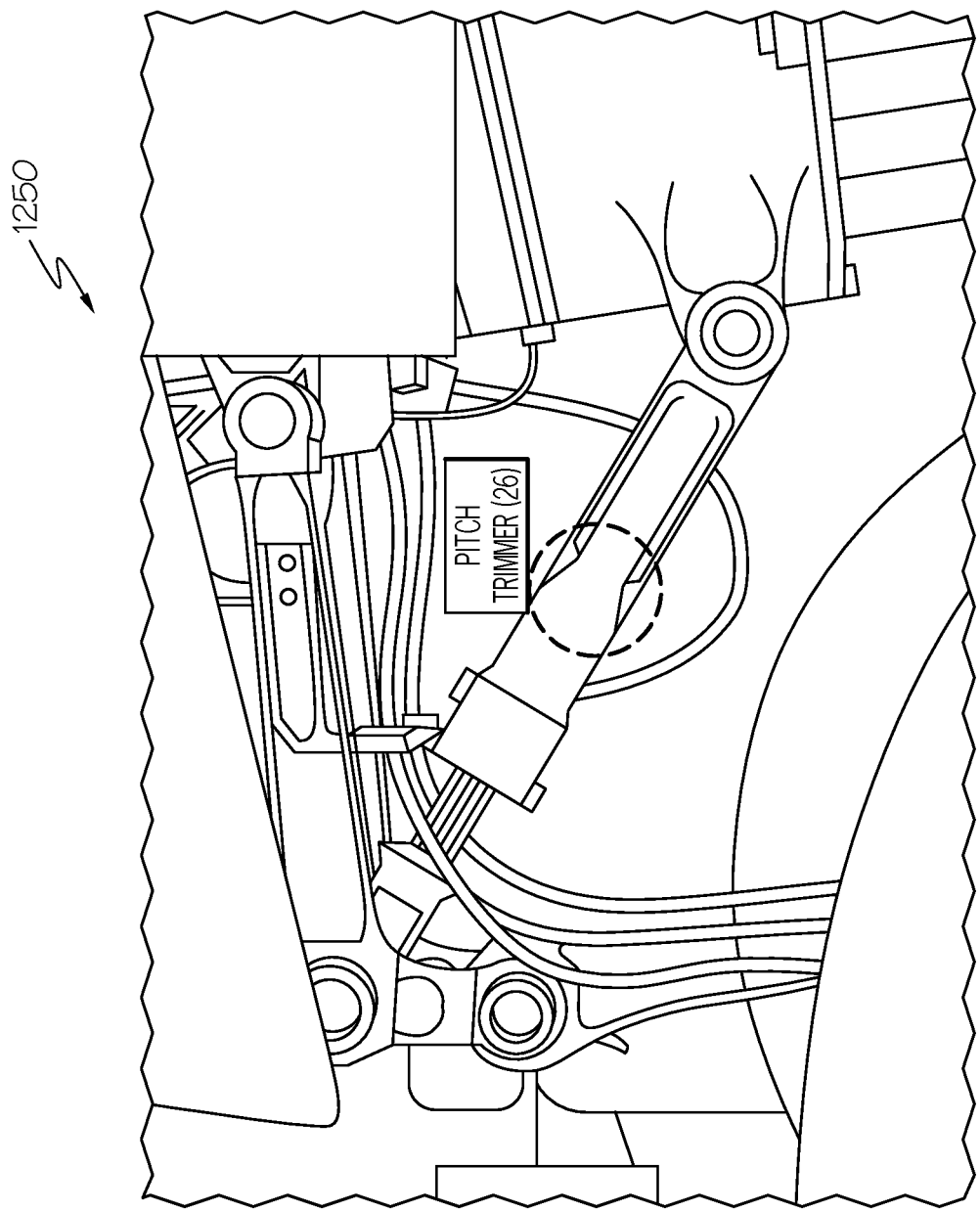
FIG. 12B depicts a popup window display according to an embodiment of the present invention.

In a real-time AR screen like FIG. 12B (AR screen excluding image on the right), information regarding a pitch trimmer can be seen through a mouse over event of a 'pitch trimmer (26)' button. As shown in FIG. 12A, 'Mouse Over Event Message' is transmitted from AR to KBS. When in receipt of this message, KBS transmits an 'ACK' message to AR. Based on the real-time AR context and as a response to the 'Mouse Over Event Message', KBS sends a 'View Change Message' to AR which signals the display of an information artifact. In one example, the information artifact may be displayed in a pop-up screen separate from the main AR screen, as shown in FIG. 12B. The pop-up screen may be at any location on the AR screen (e.g., top left, top right, bottom left, bottom right, etc.).

Figure 13:
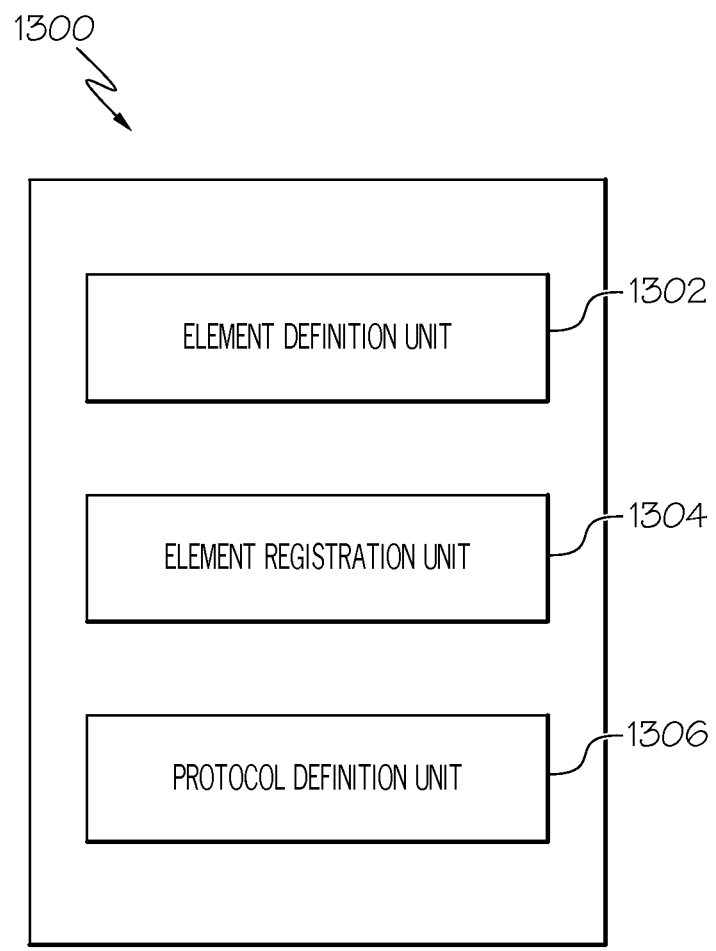
FIG. 13 depicts an example interaction system according to an embodiment of the present invention.

FIG. 13 depicts an example interaction system 1300 for unifying AR and big data. Interaction system 1300 may include element definition unit 1310, element registration unit 1320, and protocol definition unit 1330. The interaction system 1300 may implement the interaction method described in FIG. 3.

Each information artifact may include any number of interactive operation elements that offer interaction between a user and an information artifact (i.e., virtual object) displayed on the AR screen. Interactive operation elements may be associated with user actions defined by element definition unit 1310. When a user performs a particular action, a predefined event may be triggered. Essentially, each interactive operation element is associated with a hotspot (or area on the screen) which, when acted upon, triggers an event defined by element definition unit 1310. The event may include providing additional information on the real-world object associated with the area selected by displaying an information artifact or linking the user to further related content (e.g., the next step in a maintenance sequence). Exemplary user actions include, but are not limited to, single or double mouse click, physical gestures, and voice commands.

Element registration unit 1304 defines the relationship between each interactive operation element and interactive artifact. In other words, interactive operation elements and associated user actions are defined, along with the events to be performed when the user actions are executed. Element registration may include, among others, circle registration, label registration, button registration, menu registration, and animation registration.

Communication protocol unit 1306 defines the communication protocol between AR and big data. Communication protocol definition may include, among others, message ID definition, source ID definition, destination ID definition, button name definition, mouse over type definition, instruction number definition, event type definition, and action type definition. Communication protocol unit 1306 defines the communication protocol used to facilitate the event to be performed based on the user action.

The embodiments of the invention may be implemented as a computer readable signal medium or storage device, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

Although presently preferred embodiments of the present invention have been described in detail herein above, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. An interactive method for unifying augmented reality (AR) or streaming video with big data, the method comprising the computer-implemented steps of:
   obtaining an image of a set of real objects via a camera of a user device running an augmented reality application;
   establishing a communications protocol between the augmented reality application and a Semantic Web knowledge based system;
   submitting the image to the Semantic Web knowledge based system by the communication protocol;
   receiving, in real-time, information on the set of real objects based on the image via the communication protocol from the Semantic Web knowledge based system and deriving from big data in the Semantic Web knowledge based system an information artifact based on the received information for each real object;
   receiving a set of instructions over the communication protocol comprising a sequence performed on the set of real objects;
   defining an interactive operation element in the augmented reality application associated with at least one of the set of real objects, wherein the interactive operation element is associated with a performance of at least one action of the sequence performed on the set of real objects;
   associating the interactive operation element with a location on an augmented reality screen of the user device running the augmented reality application, the augmented reality screen showing a view of the set of real objects and the interactive operation element as an overlay over the view;
   monitoring a performance of an action of the sequence on a real object of the set of real objects by a user; and
   performing, in response to the action by the user, a subsequent action of the sequence as an augmented reality sequence on the view of the set of real objects in the augmented reality screen based on the information artifact derived from big data in the Semantic Web knowledge based system using the communication protocol.

2. The interactive method of claim 1, wherein the action is based on a type and a situation associated with the information artifact.

3. The interactive method of claim 1, wherein the event is a user action.

4. The interactive method of claim 3, wherein the user action is at least one of a mouse over, single mouse click, double mouse click, mouse scroll, physical gesture, or voice command.

5. The interactive method of claim 1, further comprising the computer-implemented step of connecting the interactive operation element and the information artifact.

6. The interactive method of claim 5, wherein the connecting step is made implicitly or explicitly.

7. The interactive method of claim 1, wherein the interactive operation element acts is a hotspot.

8. The interactive method of claim 7, wherein the hotspot properties include at least one of an identifier, name, position, part number, or annotation.

9. The interactive method of claim 7, wherein the hotspot includes an annotation property, wherein the annotation property includes at least one of an identifier, name, position, or color.

10. The interactive method of claim 1, further comprising the computer-implemented step of defining the communication protocol, wherein a structure of the communication protocol includes a field name and field value.

11. A computer program product for unifying augmented reality (AR) and streaming video with big data, the computer program product comprising a computer readable hardware storage device, and program instructions stored on the computer readable hardware storage device, to:
   obtain an image of a set of real objects via a camera of a user device running an augmented reality application;
   establish a communications protocol between the augmented reality application and a Semantic Web knowledge based system;
   submit the image to the Semantic Web knowledge based system by the communication protocol;
   receive, in real-time, information on the set of real objects based on the image via the communication protocol from the Semantic Web knowledge based system and deriving from big data in the Semantic Web knowledge based system an information artifact based on the received information for each real object;
   receive a set of instructions over the communication protocol comprising a sequence performed on the set of real objects;
   define an interactive operation element in the augmented reality application associated with at least one of the set of real objects, wherein the interactive operation element is associated with a performance of at least one action of the sequence performed on the set of real objects;
   associate the interactive operation element with a location on an augmented reality screen of the user device running the augmented reality application, the augmented reality screen showing a view of the set of real objects and the interactive operation element as an overlay over the view;
   monitor a performance of an action of the sequence on a real object of the set of real objects by a user; and
   perform, in response to the action by the user, a subsequent action of the sequence as an augmented reality sequence on the view of the set of real objects in the augmented reality screen based on the information artifact derived from big data in the Semantic Web knowledge based system using the communication protocol.

12. The computer program product of claim 11, wherein the action is based on a type and a situation associated with the information artifact.

13. The computer program product of claim 11, wherein the event is a user action.

14. The computer program product of claim 13, wherein the user action is at least one of a mouse over, single mouse click, double mouse click, mouse scroll, physical gesture, or voice command.

15. The computer program product of claim 11, the computer readable hardware storage device further comprising instructions to connect the interactive operation element and the information artifact.

16. The computer program product of claim 15, wherein the connection is made implicitly or explicitly.

17. The computer program product of claim 11, wherein the interactive operation element is as a hotspot.

18. The computer program product of claim 17, wherein the hotspot properties includes at least one of an identifier, name, position, part number, or annotation.

19. The computer program product of claim 17, wherein the hotspot includes an annotation property, wherein the annotation property includes at least one of an identifier, name, position, or color.

20. The computer program product of claim 11, the computer readable hardware storage device further comprising instructions to define the communication protocol, wherein a structure of the communication protocol includes a field name and field value.

* * * * *